Figure 3:
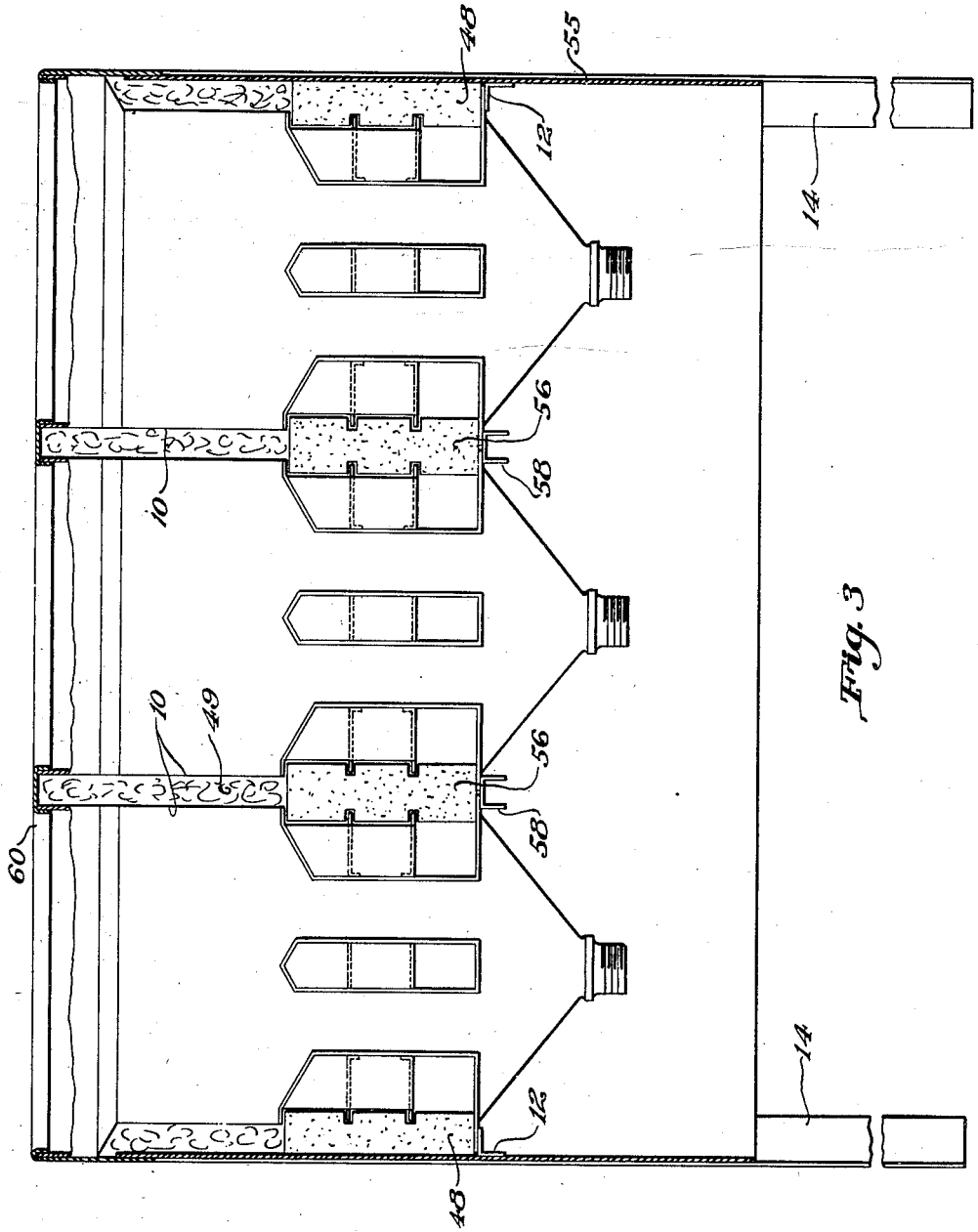

Oct. 24, 1939.    K. L. CHILDS    2,176,869
FRYING APPARATUS
Filed July 6, 1936    2 Sheets-Sheet 1
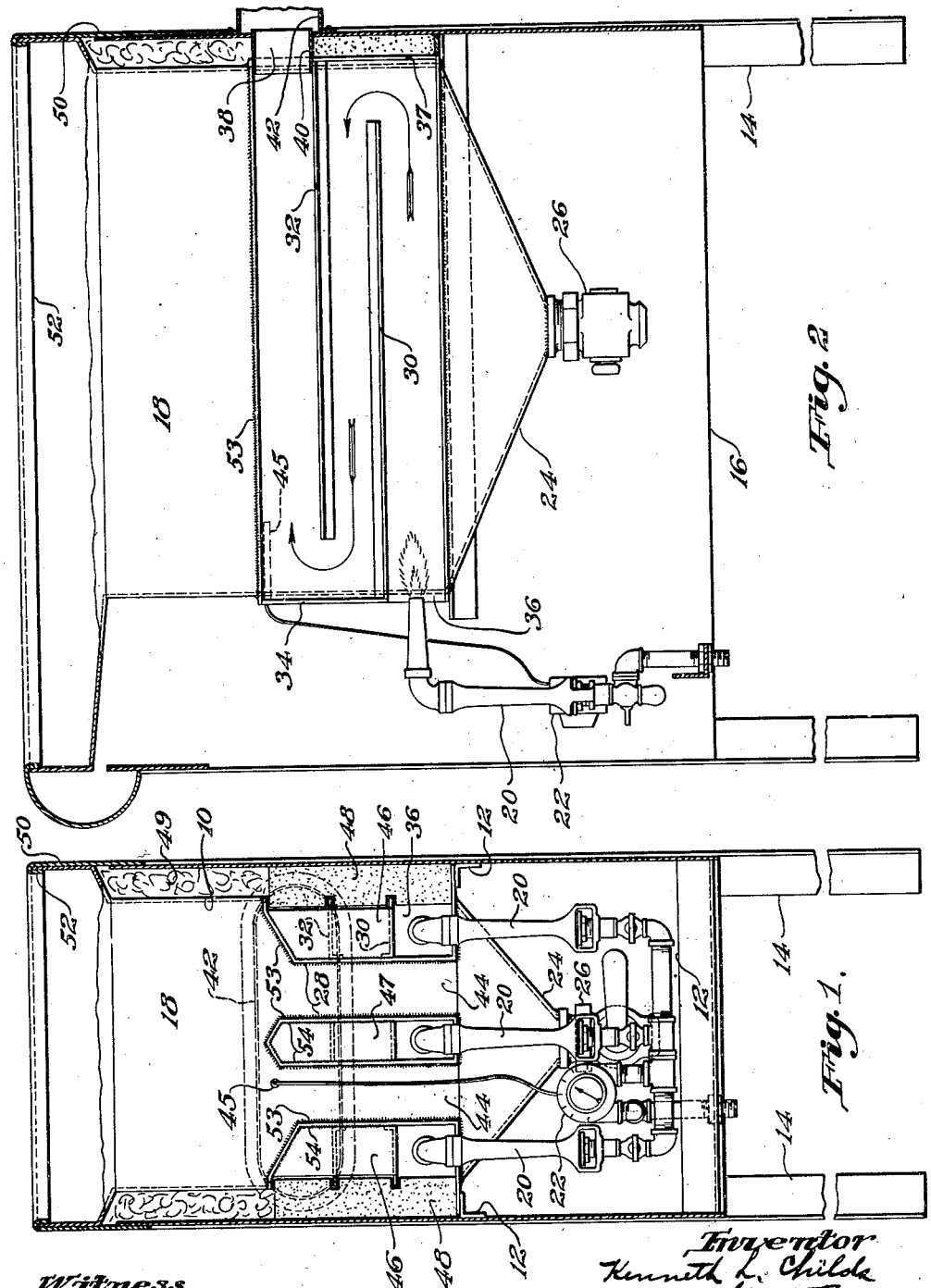

Oct. 24, 1939.  K. L. CHILDS  2,176,869
FRYING APPARATUS
Filed July 6, 1936  2 Sheets-Sheet 2

Witness
Paul F. Bryant

Inventor
Kenneth L. Childs
by his attorneys
Fish, Hildreth, Cary & Jenney

Patented Oct. 24, 1939

2,176,869

UNITED STATES PATENT OFFICE 2,176,869

FRYING APPARATUS

Kenneth L. Childs, New Haven, Conn.

Application July 6, 1936, Serial No. 88,963

3 Claims. (Cl. 53—7)

The present invention relates to frying apparatus, and more particularly to improvements in kettles heated by combustion for maintaining a supply of fat, oil, or other liquid at a suitable cooking temperature.

An object of the invention is to provide a novel and improved fat or other liquid containing kettle which may be heated by combustion with less consumption of fuel, and which may be maintained at a more even temperature than heretofore without the difficulties normally accompanying such heating. Another object of the invention is to improve the construction of a kettle of this type, together with its supporting means in which the parts are manufactured from materials of relatively low cost and assembled easily. A further object is to provide a novel and improved construction for apparatus of this nature having a number of fat or other liquid containing kettles provided in a single unitary assemblage.

It is the usual practice in heating liquid-containing kettles by combustion to direct a flame through the side walls of a kettle by means of an ordinary metal pipe of circular cross-section properly vented at its end remote from the point where the flame enters. Unless the pipe passes completely through both sides of the kettle, threaded joints and pipe fittings of suitable construction to make the necessary bends are required. If the pipe passes completely through the kettle, the heated gases of combustion are not sufficiently reduced in temperature to provide efficient heating. The use of threaded joints and pipe fittings also is undesirable due to possible fat leakage, and to difficulties in cleaning the crevices and confined angular spaces formed in the kettle at the joints of the fittings.

In order to avoid these difficulties, the present invention contemplates the provision of a kettle mounted in a supporting casing and constructed with a combustion chamber within the lower portion of the kettle having elongated heating passages, certain of the confining walls or partitions of which are common to each other throughout the length of the passages and other walls of which are exposed to the interior of the kettle throughout the lengths of the passages. With this arrangement, substantially all of the heat from the gases of combustion is subtracted while the construction of the outer chamber walls exposed to the interior of the kettle is of regular contour without bends and with a minimum of external confined crevices which present difficulties in cleaning or in the proper circulation of the fat or other liquid within the kettle. The partitions preferably are horizontal so as to divide the space in the combustion chamber into a vertical tier of passages. With the construction as illustrated in the drawings, the inlet to the combustion chamber is at one side of the kettle and the outlet is at the other side, the partitions being so arranged that the passages lead from one to another in a series between the inlet and outlet.

In order to provide working space through which the bottom of the kettle may be cleaned, according to another feature of the invention, the kettle is constructed and arranged with reentrant sides partially enclosing the combustion chambers while the area between the combustion chambers in the kettle is left open. With this construction, the combustion chambers are closed at the sides of the kettle by suitable insulating barriers. To increase rapidly the temperature of a large kettle, as when bringing the fat to the cooking point, in connection with this feature of the invention, a central combustion chamber, the side walls of which are entirely surrounded by the fat in the kettle is located between the combustion chambers at the sides of the kettle while leaving sufficient space between the several chambers for convenient cleaning.

To simplify the construction and reduce the outside dimensions of the kettle in the apparatus as disclosed, the kettle is constructed with a generally rectangular shape and the passages of the combustion chamber are also rectangular in cross-section with side walls exposed to the interior of the kettle arranged vertically. By making the kettle and the passages of rectangular section, partitions may be of flat plane sheet metal and the heat from burning gases along one section of the passage will be partly transferred through the partitions to improve the combustion effect in the adjacent passages.

Other features of the invention including certain details of construction and combinations of parts are hereinafter described in the following detailed specification and more particularly pointed out in the appended claims.

In the drawings, Figure 1 is a view in front elevation, partly broken away and shown in section of apparatus embodying the features of the present invention; Figure 2 is a view in side elevation similarly broken away and shown in section, of the apparatus illustrated in Figure 1; and Figure 3 is a view similar to that shown in Figure 1, of apparatus including a number of kettles arranged in the form of a battery.

The apparatus illustrated in the drawings is a self-contained structure similar in some respects to that disclosed in inventor's application for U. S. Letter Patent Serial No. 114,146, filed December 4, 1936, for frying edible or other articles in fat, oil, or other liquid raised to moderately high cooking temperature in a manner commonly termed "deep fat frying". Articles of food prepared in this manner are carried beneath the surface of the heated fat or oil at a sufficient depth to insure that all parts of the article immersed will be covered by fat of substantially the same temperature. The fat is heated ordinarily in a kettle of rectangular shape which, at its upper portion, is provided with vertical sides and between which a suitable clear depth of heated fat is contained.

Referring more particularly to the drawings, the kettle, constructed of flat sheet metal, is indicated at 10, resting at its lower side edges on the horizontal flanges of a frame 12 having vertical legs 14. Between the legs 14 and surrounding the frame 12 there is a three-walled rectangular enclosure 16 formed of vertical sheet metal plates having the front side left open. Access to the interior kettle is had through the upper portion of the enclosure and the cooking space in the kettle is indicated generally by the numeral 18. At the lower portion of the kettle beneath the cooking space 18, the heating apparatus is provided, which is in the form of gas fed combustion chambers. To supply the gas with the proper mixture of air, the frame 12 near the lower part of the main casing supports three gas burners 20 regulated by a thermostatically controlled valve 22. Beneath the combustion chambers, the kettle 10 is formed with a funnel shaped sediment collecting drain portion 24, the tapering surfaces of which enter into a drain valve 26.

In the apparatus embodying the present invention, combustion chambers of generally rectangular section pass through the front and rear sides of the kettle and have at least one of their side walls, indicated at 28, arranged vertically and exposed to the interior of the kettle. The combustion chambers are substantially rectangular in cross-section and are divided into a zig-zag series of elongated heating passages arranged in a vertical tier by means of straight horizontal walls or partitions 30 and 32. The heating passages thus formed are of rectangular cross-section with plane vertical side walls exposed to the interior of the kettle. The lowermost partition 30 in each combustion chamber extends from the front edge of the chamber to a point some distance from the rear end of the chamber so as to provide an interconnecting opening from the lowermost passage to the next highest. The second partition is arranged to connect the rear end of the combustion chamber and to extend nearly to the front end thereof, while leaving an opening for the flow of gases to the next highest passage formed by the partition 32. At the forward end of each combustion chamber is a vertical end plate 34 covering the ends of the two highest passages while the lowermost passage is left open providing an inlet 36 through which the ignited gases are projected. At the rear of each combustion chamber is an end plate 37 covering the ends of the first two passages while leaving the uppermost passage open to form an outlet 38. In the outlet 38 is a short flue connection 40 leading through the rear side of the enclosure 16 into a common manifold or draft pipe 42. The side walls 28 of each combustion chamber thus constructed is surrounded by fat within the kettle and the vertical side walls of the combustion chambers are so spaced as to form vertical wells 44 of unbroken side surfaces, the lower ends of which open into the funnel shaped portion 24 of the kettle to receive sediment passing through the wells. The spacings of the combustion chambers are sufficient to provide ample openings in the wells 44 for cleaning the entire kettle. The top portions of the combustion chambers are inclined at an angle to the horizontal so as to direct sediment deposited thereon into the wells 44, and the heating passage formed by the partition 30 at the lowest part of each combustion chamber causes the most highly heated gases to be carried to full length of each combustion chamber before rising to a higher level. This insures that the highest temperatures will be applied at the lowest parts of the wells 44 where the fat is coolest.

With the gases of the highest temperature being conducted along the under-surfaces of the common wall or partition 30 some of the heat is transferred through the partition 30 so as to facilitate the combustion of any unburned gases in the passage above. The same effect takes place in the highest passage formed by the partition 32. The partitions also act to transfer a certain proportion of the heated gases to the side walls 28 of the combustion chambers, thus increasing the efficiency of heat transfer to the kettle.

When heated in this way, the fat rises through each well 44 substantially to the uppermost level of the fat where the highest temperatures are reached, a cooler downwardly flowing current of fat taking the place of the upwardly rising heated fat. To obtain an accurate regulation of fuel without actually locating the thermostat in the cooking space 18 where its presence may interfere with the cooking operations, the temperature responsive portion 45 of the thermostat is located at the upper part of one of the wells 44 in a position where the upwardly rising heated fat may come in contact therewith.

The kettle 10 is heated by means of two outside or end combustion chambers, indicated at 46 and one central combustion chamber, indicated at 47, the central combustion chamber 47 being entirely immersed with both sides, top and bottom exposed to the interior of the kettle, and one side, top and bottom only of the two end combustion chambers 46 being exposed to the interior of the kettle. The walls of the end combustion chambers thus form reentrant surfaces in the sides of the kettle, each with one side uncovered, the partitions 30 and 32 in the end combustion chambers being each attached at one edge only to the single vertical wall of each end combustion chamber.

To prevent escape of the heated gases from the end combustion chambers, the outer casing is shielded by rigid barriers or blocks 48 of heat insulating material. The unattached edges of the partitions 30 and 32 are imbedded in the sides of the blocks 48 which are preformed and slid horizontally into place, or may be built up with suitable cement material from a plurality of bricks or other smaller units. When located in proper position, the blocks 48 are supported by the frame members 12 so as not to apply undue strains to the sides of the kettle. The cooking space 18 of the kettle also is made smaller than the casing to accommodate additional heat insulating material 49 packed between the two.

To provide an integral covering for the space between the sides of the kettle 10 and the casing, the upper part of the kettle above the cooking space 18 is enlarged so that the upper edges of the kettle extend above in substantial alignment with the edge portions of the enclosure 16, and the entire kettle is surrounded by an apron 50 overlapping the edges of the kettle and enclosure. The upper part of the apron is flanged and reversely bent at 52 so as to extend downwardly into the interior of the kettle.

To enable the parts of the kettle to be joined together conveniently and with a minimum possibility of leakage, the walls 28 of each combustion chamber are arranged to extend entirely through opposite sides of the kettle with the edges projecting beyond the sides of the kettle. The angle formed by the projecting edges of each combustion chamber wall and the adjacent kettle side provides convenient surfaces for welding a tight seam, indicated at 53. The end plates 34 are then attached at the extreme edges of the combustion chamber wall by a similar welded seam 54 without affecting the security of the first seam 53.

When a number of kettles are to be employed in the form of a battery, as when treating articles successively at different temperatures, several kettles constructed in the manner just described may be supported in a casing 55 (see Fig. 3) sufficiently large to surround them. Substantially all of the parts of the apparatus are duplicated in the case of each kettle except that the blocks 48 of insulating material are used only at the ends of the casing, and special blocks 56 having grooves on both sides are employed between adjacent kettles, each supported on a channel shaped frame member 58 which also acts to support the lower edges of the corresponding kettles. The upper edges of the kettles are protected by an apron 60 having a flanged opening for each kettle, the edges of which flanged opening are bent downwardly into the kettles. Other parts of the battery construction are substantially the same except that the upper parts at adjacent sides of the kettles are straight and the entire space between them packed with the heat insulating material 49.

The invention having been specifically described, what is claimed is:

1. Frying apparatus having, in combination, a casing comprising an inner frame, and a side enclosure, a battery of kettles of generally rectangular shape in said casing, each resting at its lower portion on the frame inside the casing, combustion chambers each having one vertical side wall exposed to the interior of a kettle, a heat insulating barrier supported on the frame of the casing to form the other side wall of a combustion chamber and to prevent the heat of one kettle from affecting an adjacent kettle, and one or more horizontal partitions in each combustion chamber having their opposite edges attached to said first mentioned side wall and embedded in the heat insulating barrier respectively for dividing the combustion spaces of each chamber into a series of elongated passages.

2. Frying apparatus having, in combination, a kettle, and one or more combustion chambers in the form of horizontal elongated passages, each surrounded in part by a reentrant side portion of the kettle and in part by a barrier of heat insulating material closing the reentrant side portion.

3. Frying apparatus having, in combination, a kettle having one or more reentrant side portions and one or more horizontally elongated combustion chambers formed by the reentrant side portions of the kettle, and a central elongated combustion chamber in the kettle between, but suitably spaced from the reentrant side portions of the kettle, with its sides, top and under surfaces exposed to the interior of the kettle.

KENNETH L. CHILDS.